US007896569B2

(12) United States Patent
Katzenstein

(10) Patent No.: US 7,896,569 B2
(45) Date of Patent: Mar. 1, 2011

(54) JOINT ARRANGEMENT FOR THE CONNECTION OF TWO SEGMENTS OF A PATIENT BED

(75) Inventor: Bernhard Katzenstein, Baden-Baden (DE)

(73) Assignee: Maquet GmbH & Co. KG, Rastatt (DE)

( * ) Notice: Subject to any disclaimer, the term of this patent is extended or adjusted under 35 U.S.C. 154(b) by 502 days.

(21) Appl. No.: 11/598,315

(22) Filed: Nov. 13, 2006

(65) Prior Publication Data

US 2007/0116512 A1 May 24, 2007

(30) Foreign Application Priority Data

Nov. 14, 2005 (DE) ......................... 10 2005 054 175

(51) Int. Cl.
*F16D 1/12* (2006.01)
*F16D 3/00* (2006.01)
*F16C 11/00* (2006.01)

(52) U.S. Cl. .......... 403/97; 403/84; 403/101; 403/322.4; 5/618

(58) Field of Classification Search .................... 403/83, 403/84, 92, 896, 101, 157, 322.4, 96, 97, 403/105, 150, 151, 154, 322.1; 5/613, 618, 5/624
See application file for complete search history.

(56) References Cited

U.S. PATENT DOCUMENTS 566,521 A * 8/1896 Leger ............................ 403/105
1,740,906 A 12/1929 Rothauszky et al.
2,416,410 A 2/1943 Shampaine
2,763,320 A 9/1956 Schram
2,764,459 A 9/1956 McDonald
2,771,330 A 11/1956 Zaalberg
2,775,496 A 12/1956 Berggren
2,816,806 A 12/1957 Zaalberg
2,995,762 A 8/1961 Albinson
3,226,734 A 1/1966 Coventon
3,238,539 A 3/1966 Koch (Continued)

FOREIGN PATENT DOCUMENTS

DE 264297 8/1912

(Continued)

OTHER PUBLICATIONS

European Search Report for Serial No. EP 06 12 3443 dated Feb. 7, 2007.

(Continued)

*Primary Examiner* — Michael P Ferguson
*Assistant Examiner* — Nahid Amiri
(74) *Attorney, Agent, or Firm* — McCormick, Paulding & Huber LLP

(57) ABSTRACT

What is described is a joint arrangement for the articulated connection of two segments of a patient bed, with two joint parts (36, 38), each of which is connected rigidly to one of the segments and which are pivotable relative to one another about a common joint axis (64) by means of a shaft journal (46), the joint parts (36, 38) carrying, in each case on at least one of their faces confronting one another axially, blocking faces (60) intended for bearing against one another, and the joint parts (36, 38) being capable of being tensioned axially relative to one another by means of a tensioning mechanism (46, 54, 50), and the blocking faces (60) lying in each case at least approximately in a plane containing the joint axis (64).

13 Claims, 5 Drawing Sheets

U.S. PATENT DOCUMENTS

| | | | | |
|---|---|---|---|---|
| 3,302,218 | A | 2/1967 | Stryker | |
| 3,328,079 | A | 6/1967 | Byczkowski et al. | |
| 3,362,704 | A | 1/1968 | Pilz | |
| 3,379,877 | A | 4/1968 | Makino et al. | |
| 3,388,700 | A | 6/1968 | Mountz | |
| 3,868,103 | A | 2/1975 | Pageot et al. | |
| 4,101,120 | A | 7/1978 | Seshima | |
| 4,176,415 | A | 12/1979 | Dickerson et al. | |
| 4,244,358 | A | 1/1981 | Pyers | |
| 4,597,119 | A | 7/1986 | Padgett | |
| 4,640,482 | A * | 2/1987 | Rogers | 248/168 |
| 4,768,241 | A | 9/1988 | Beney | |
| 5,031,547 | A | 7/1991 | Hirose | |
| 5,083,331 | A | 1/1992 | Schnelle et al. | |
| 5,220,698 | A | 6/1993 | Hannant | |
| 5,277,427 | A * | 1/1994 | Bryan et al. | 473/232 |
| 5,279,011 | A | 1/1994 | Schnelle | |
| 5,477,570 | A | 12/1995 | Hannant et al. | |
| 5,544,376 | A | 8/1996 | Fromson | |
| 5,564,852 | A * | 10/1996 | Maxwell et al. | 403/97 |
| 5,611,638 | A | 3/1997 | Dorr et al. | |
| 5,615,431 | A | 4/1997 | Vassilli | |
| 5,621,932 | A | 4/1997 | Strachan | |
| 5,628,078 | A | 5/1997 | Pennington et al. | |
| 5,649,833 | A | 7/1997 | Pfeuffer et al. | |
| 5,651,150 | A | 7/1997 | Kanitzer et al. | |
| 5,659,909 | A | 8/1997 | Pfeuffer et al. | |
| 5,754,997 | A | 5/1998 | Lussi et al. | |
| 5,769,720 | A * | 6/1998 | Aiken et al. | 464/128 |
| 5,787,528 | A | 8/1998 | Antinori | |
| 5,790,996 | A | 8/1998 | Narfstrom | |
| 5,914,796 | A | 6/1999 | Selin | |
| 5,969,488 | A | 10/1999 | Fromson | |
| 6,008,598 | A | 12/1999 | Luff et al. | |
| 6,038,718 | A | 3/2000 | Pennington et al. | |
| 6,073,284 | A | 6/2000 | Borders | |
| 6,095,713 | A * | 8/2000 | Doyle et al. | 403/97 |
| 6,351,678 | B1 | 2/2002 | Borders | |
| 6,390,927 | B1 * | 5/2002 | Cleveland, III | 464/119 |
| 6,396,224 | B1 | 5/2002 | Luff et al. | |
| 6,484,334 | B1 | 11/2002 | Borders et al. | |
| 6,560,492 | B2 | 5/2003 | Borders | |
| 6,565,156 | B1 * | 5/2003 | Yamashita et al. | 297/354.12 |
| 6,609,260 | B2 | 8/2003 | Hand et al. | |
| 6,619,872 | B2 * | 9/2003 | Crorey et al. | 403/97 |
| 6,634,202 | B1 * | 10/2003 | Oetiker | 72/292 |
| 6,722,289 | B2 | 4/2004 | Kato | |
| 6,862,761 | B2 | 3/2005 | Hand et al. | |
| 6,971,131 | B2 | 12/2005 | Bannister | |
| 6,986,179 | B2 | 1/2006 | Varadharajulu | |
| 7,010,369 | B2 | 3/2006 | Borders et al. | |
| 7,068,143 | B2 | 6/2006 | Doering et al. | |
| 7,089,612 | B2 | 8/2006 | Rocher et al. | |
| 7,154,397 | B2 | 12/2006 | Zerhusen et al. | |
| 7,181,791 | B2 | 2/2007 | Clayton | |
| 7,210,201 | B2 * | 5/2007 | Maeckle et al. | 24/270 |
| 7,235,942 | B2 | 6/2007 | Nagaoka et al. | |
| 7,321,811 | B1 | 1/2008 | Rawls-Meehan | |
| 7,346,944 | B2 | 3/2008 | Shaw | |
| 7,367,740 | B2 * | 5/2008 | Lazic et al. | 403/97 |
| 7,398,790 | B2 * | 7/2008 | Glatz | 135/20.1 |
| 7,412,736 | B2 | 8/2008 | Hyre et al. | |
| 7,526,823 | B2 | 5/2009 | Koch | |
| 7,634,826 | B2 | 12/2009 | Koch | |
| 7,669,258 | B2 | 3/2010 | Koch | |
| 2002/0111701 | A1 | 8/2002 | Borders | |
| 2002/0170115 | A1 | 11/2002 | Borders et al. | |
| 2003/0078144 | A1 | 4/2003 | Gehrke | |
| 2003/0195644 | A1 | 10/2003 | Borders et al. | |
| 2004/0006821 | A1 | 1/2004 | Hand et al. | |
| 2004/0074003 | A1 | 4/2004 | Bannister | |
| 2004/0172757 | A1 | 9/2004 | Somasundaram | |
| 2007/0056105 | A1 | 3/2007 | Hyre et al. | |
| 2007/0101497 | A1 | 5/2007 | Revenus | |
| 2007/0101500 | A1 | 5/2007 | Fruh et al. | |
| 2007/0107123 | A1 | 5/2007 | Koch | |
| 2007/0107124 | A1 | 5/2007 | Koch | |
| 2007/0107125 | A1 | 5/2007 | Koch | |
| 2007/0107126 | A1 | 5/2007 | Koch | |
| 2007/0107129 | A1 | 5/2007 | Burstner | |
| 2007/0110448 | A1 | 5/2007 | Ruch | |
| 2007/0116512 | A1 | 5/2007 | Katzenstein | |
| 2007/0118989 | A1 | 5/2007 | Koch | |
| 2009/0119842 | A1 | 5/2009 | Koch | |

FOREIGN PATENT DOCUMENTS

| | | | |
|---|---|---|---|
| DE | 19732467 | A1 | 2/1992 |
| DE | 4229318 | C1 | 9/1993 |
| DE | 296 10 726 | U1 | 9/1996 |
| DE | 197 51 320 | A1 | 5/1999 |
| DE | 19748367 | A1 | 5/1999 |
| DE | 19751329 | A1 | 5/1999 |
| DE | 19919496 | A1 | 11/2000 |
| DE | 102 53 878 | A1 | 5/2004 |
| DE | 102 53 906 | A1 | 6/2004 |
| EP | 0 457 246 | A1 | 11/1991 |
| EP | 0625348 | A1 | 11/1994 |
| EP | 0832603 | A1 | 4/1998 |
| EP | 0 913 139 | | 5/1999 |
| FR | 2388546 | | 11/1978 |
| GB | 1321193 | | 6/1973 |
| GB | 2260075 | A | 4/1993 |
| GB | 2 277 870 | A | 11/1994 |
| WO | 99 28146 | A1 | 6/1999 |
| WO | 02 055001 | A1 | 7/2002 |
| WO | 03 086263 | A1 | 10/2003 |

OTHER PUBLICATIONS

European Search Report for Serial No. EP 06 12 3596 dated Sep. 7, 2007.

European Search Report for Serial No. EP 06 12 3593 dated Dec. 4, 2007.

European Search Report for Serial No. EP 06 12 3598 dated Feb. 8, 2007.

V. Vitsas, et al., Performance Analysis of the Advanced Infrared (Air) CSMA/CA MAC Protocol for Wireless LANs, Kluwer Academic Publishers, Wireless Networks 9, pp. 495-507.

European Search Report for Application No. EP 06 12 3592, dated Nov. 29, 2007.

European Search Report for Application No. EP 06 12 3719, dated Sep. 7, 2007.

European Search Report for Application No. EP 06 12 3721, dated Jun. 20, 2008.

European Search Report for Application No. EP 06 12 3444, dated Aug. 22, 2008.

* cited by examiner

JOINT ARRANGEMENT FOR THE CONNECTION OF TWO SEGMENTS OF A PATIENT BED

CROSS REFERENCE TO RELATED APPLICATIONS

Applicant hereby claims foreign priority benefits under U.S.C. §119 from German Patent Application No. 10 2005 054 175.5 filed on Nov. 14, 2005, the contents of which are incorporated by reference herein.

FIELD OF THE INVENTION

The invention relates to a joint arrangement for the articulated connection of two segments of a patient bed, with two joint parts, each of which is connected rigidly to one of the segments and which are pivotable relative to one another about a common joint axis by means of a shaft journal, the joint parts carrying, in each case on at least one of their faces confronting one another axially, blocking faces intended for bearing against one another, and the joint parts being capable of being tensioned axially relative to one another by means of a tensioning mechanism.

BACKGROUND OF THE INVENTION

A joint arrangement of the abovementioned type is known, for example, from DE 102 53 906 A1. In the joint arrangement described there, the mutually confronting faces of the joint parts carry a toothing with a symmetrical tooth profile. This joint arrangement, as a rule, ensures a reliable hold in the respectively set position of the segments in relation to one another, as long as the tensioning mechanism is effective. In the known embodiment, the tensioning mechanism comprises an eccentric lever which is mounted pivotably on the shaft journal and which, when the eccentric lever is thrown, acts as a tie rod, by means of which the two joint parts are tensioned with their tooth profiles relative to one another. The oblique tooth flanks give rise, at least when the bed segments are subjected to load, to spreading forces which attempt to press the joint parts away from one another. If the tensioning mechanism is not tightened reliably or, for example, the eccentric lever is mistakenly adjusted in the opening direction, there is the risk that the loaded bed segment abruptly swings downwards. This risk is great particularly when the patient's entire weight bears on the respective bed segment.

SUMMARY OF THE INVENTION

The object on which the invention is based is to specify a joint arrangement of the type mentioned in the introduction which has a high load-bearing capacity and is functionally reliable.

This object is achieved, according to the invention, in that the blocking faces lie in each case at least approximately in a plane containing the joint axis.

In the joint arrangement according to the invention, the blocking faces are loaded perpendicularly to their plane, so that the load does not give rise to any spreading forces which attempt to press the joint parts away from one another. Even if, therefore, the tensioning mechanism is not tightened completely or has mistakenly been opened before the respective bed segment has been relieved of load, the blocking faces remain in engagement with one another, unchanged, so that a sudden downward swing of the loaded bed segment is avoided. Preferably, the joint parts carry, on their confronting faces one another, a toothing with a sawtooth profile, so that an adjustment of the bed segments in small steps about the axis of the shaft journal is possible.

So that the bed segments connected to one another via the joint arrangement according to the invention can also be separated from one another in a simple way, it is expedient if one of the joint parts is designed in a way known per se as a fork which can be slipped radially onto the shaft journal connected to the other joint part. In this case, to increase safety, the shaft journal carries a securing element which projects radially from it and which is dimensioned such that it closes, that is to say at least approximately fills, the fork aperture remaining after the fork has been pushed onto the shaft journal.

Closing the fork aperture prevents the situation where an operator, after slipping the fork onto the shaft journal, introduces his finger into the fork aperture and, during the pivoting of the bed segment connected to the fork, pinches his finger or fingers between a fork leg and a fixed part of the other bed segment.

Preferably, the securing element is mounted freely rotatably on the shaft journal, so that it is always set to the respective position of the fork aperture independently of the position of the shaft journal.

For additional securing, in the joint arrangement according to the invention, on one of the joint parts, a disengageable locking element may be arranged, which, in at least one predetermined pivoting position of the two joint parts, comes into effective engagement with the other joint part in each case, in order to prevent a relative movement of the joint parts at least in the direction of movement blocked by the blocking faces. This is advantageous, for example, for setting the bed segments in situations where one of the bed segments hangs approximately vertically downwards, whilst the bed segment connected via a joint arrangement according to the invention is again directed approximately horizontally, so that a patient can kneel on the latter bed element. Since, in this case, he rests virtually with his entire weight on the horizontal bed portion, it is necessary to ensure that this bed segment does not suddenly swing downwards, specifically not even when the tensioning mechanism of the joint arrangement is inadvertently opened.

Instead of the above-described tensioning mechanism with a tie rod and with an eccentric lever, the tensioning means may also comprise a screw grip which is in threaded engagement with the shaft journal, the two joint parts being tensioned relative to one another by the screw grip being screwed onto the shaft journal.

BRIEF DESCRIPTION OF THE DRAWINGS

Further features and advantages of the invention may be gathered from the following description which explains the invention by means of an exemplary embodiment, in conjunction with the accompanying drawings in which.

DETAILED DESCRIPTION OF THE INVENTION

Figure 1:
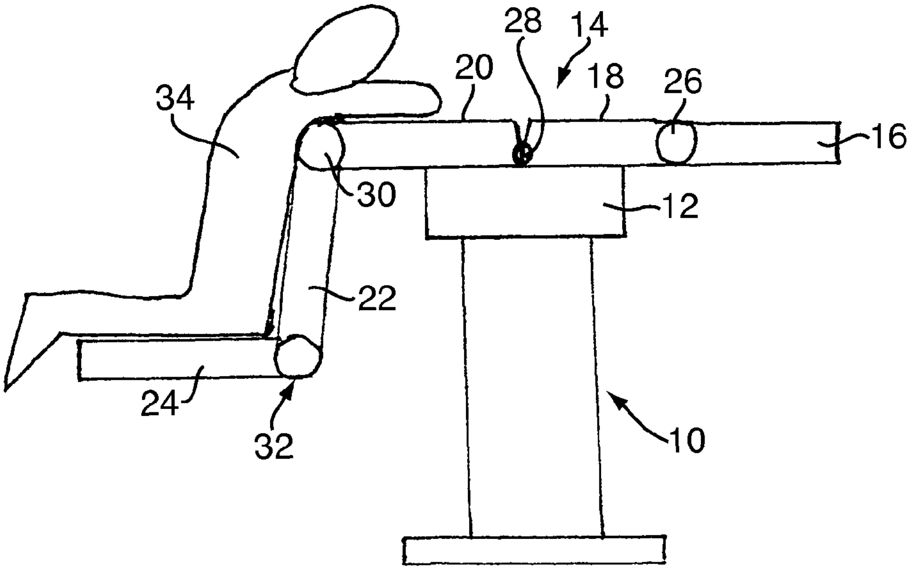
FIG. 1 shows a diagrammatic side view of an operating table in a special position of the bed segments in order to explain the problem on which the invention is based.

FIG. 1 shows a highly diagrammatically illustrated operating table with a table column 10, on the column head 12 of which is arranged a bed 14 which comprises a plurality of segments 16, 18, 20, 22 and 24 which are connected to one another and are adjustable in relation to one another via joints 26, 28, 30, 32. The bed portions or segments 22 and 24 are set such that the segment 22 is directed almost vertically downwards and at its lower end carries the horizontally directed segment 24. The patient 34 kneels on the latter in what is known as a rectal support. It is obvious that the patient's weight rests almost completely on the bed segment 24. Particularly in such an instance, it is necessary to ensure that the joint 32 can be fixed in this position such that the bed segment 24 does not swing away downwards completely either gradually or suddenly, even if a tensioning mechanism closing the joint arrangement is inadvertently loosened or completely opened before the bed portion 24 is relieved of load.

The joint arrangement achieving this object, then, will be explained in more detail with reference to FIGS. 2 to 8.

Figure 2:
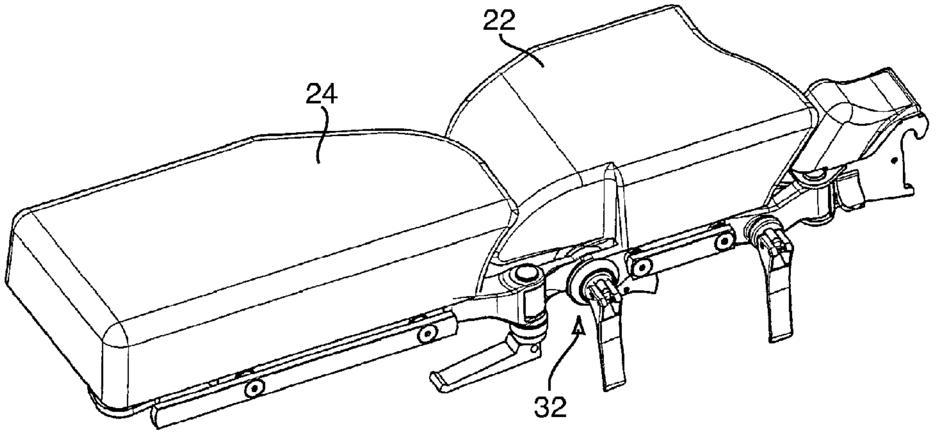
FIG. 2 shows a perspective view of two bed segments connected to one another by means of a joint arrangement according to the invention.
Figure 3:
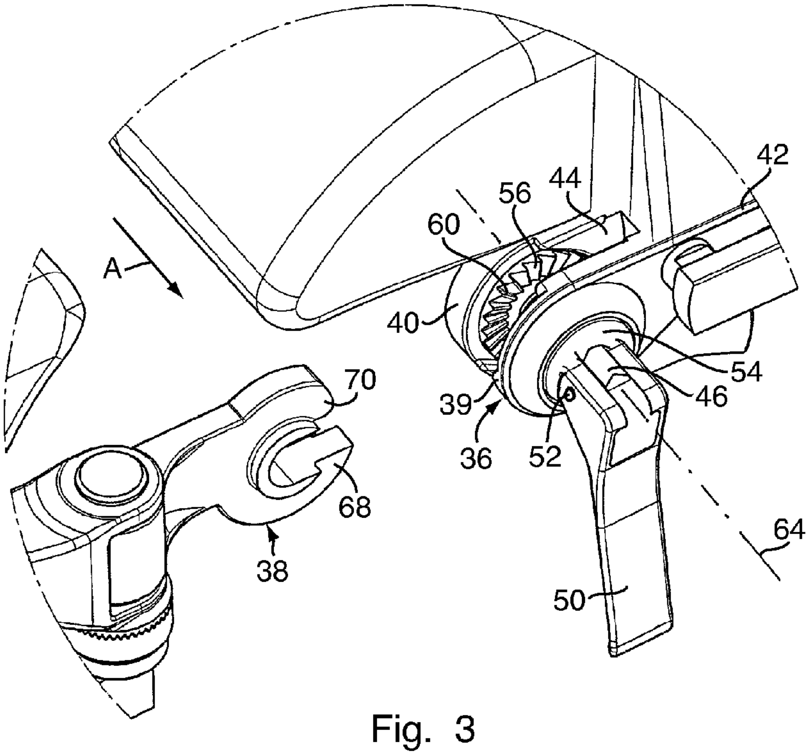
FIG. 3 shows an enlarged part view of the joint parts of the bed segments to be connected to one another.
Figure 5:
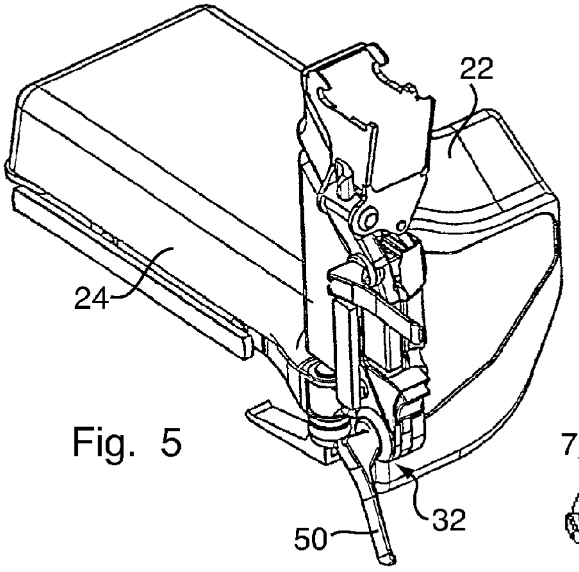
FIG. 5 shows a perspective illustration of the bed segments illustrated in FIG. 2, in a position pivoted through 90° relative to one another.
Figure 4:
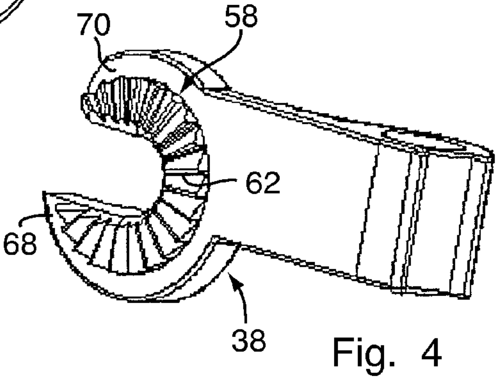
FIG. 4 shows a view, in the direction of the arrow A, of the fork-shaped joint part illustrated in FIG. 3.
Figure 6:
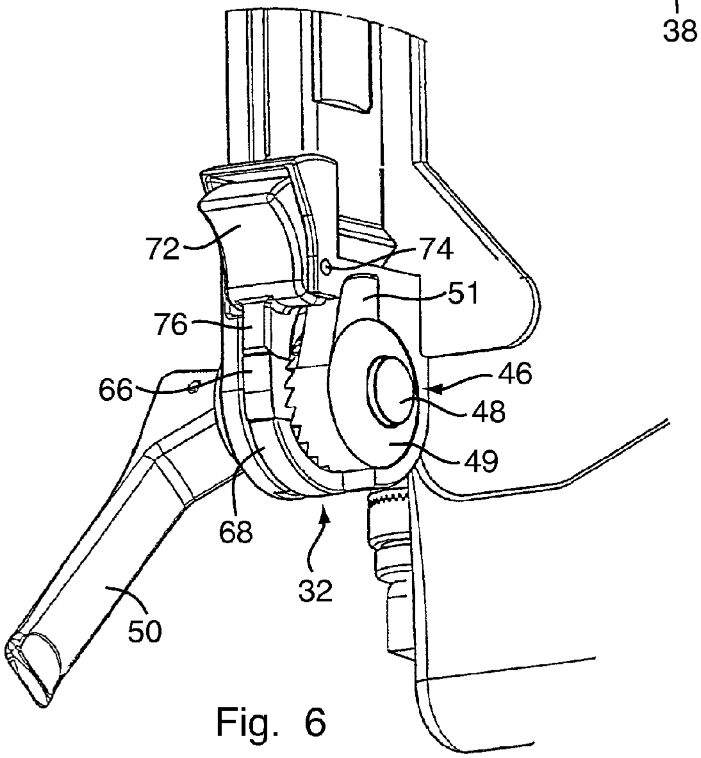
FIG. 6 shows an enlarged view of a detail of the joint arrangement in the position of the bed segments in relation to one another, as illustrated in FIG. 5.
Figure 7:
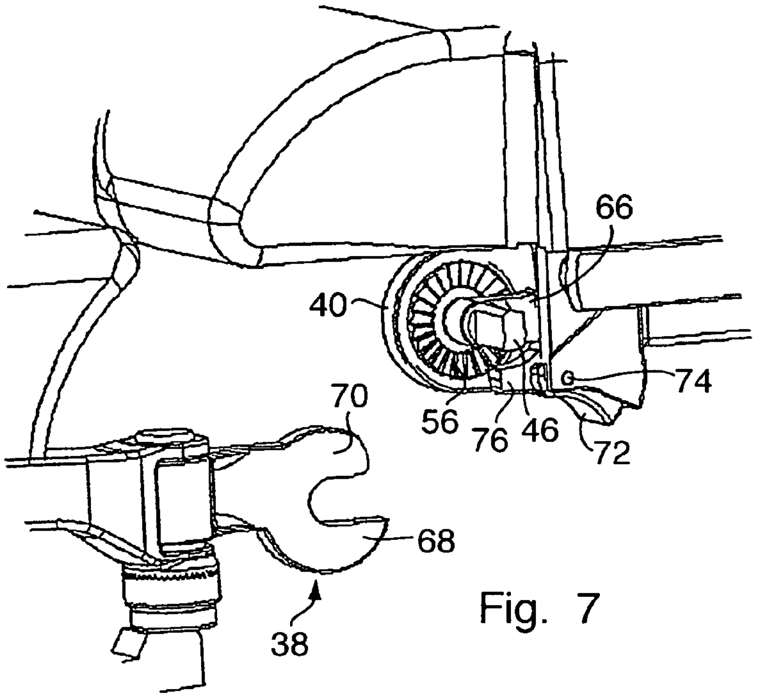
FIG. 7 shows a diagrammatic illustration, corresponding approximately to the view in FIG. 3, of the joint arrangement, in which the joint part comprising the shaft journal has been partially cut away.

FIG. 2 shows two bed segments 22 and 24 which serve as thigh and lower-leg supports and which are connected to one another by means of a joint arrangement 32 according to the invention. The joint arrangement 32 comprises a joint part 36 assigned to the bed segment 22 and a joint part 38 assigned to the bed portion 24 (FIG. 3). The joint part 36 is formed on two mutually parallel end portions 39, 40 of a spar 42 of the bed portion 22, the said end portions forming between them a gap 44 in which the joint part 38 of fork-shaped design on the bed segment 24 can be pushed. Through the two end portions 39, 40, a shaft journal 46 extends, which is freely rotatable in the end portions 39 and 40 and which is designed as a tie rod and at one end carries a flange 48 with which it bears against the outside of a cylindrical thrust piece 49. The thrust piece 49 is mounted axially displaceably in a bore of the end portion 40 and is secured against rotation with respect to the end portion 40 by means of an approximately radially projecting extension 51 which engages into a complementary clearance in the end portion 40 (FIG. 6). The shaft journal 46 carries at its other end an eccentric lever 50 which is articulated on the shaft journal 46 about an axis 52 and acts on a thrust piece 54 which is mounted axially displaceable in the shaft journal 46 and is supported in a bore in the end portion 39 of the spar 42 on the latter. By the eccentric lever 50 being pivoted into the position illustrated in FIG. 3, the fork-shaped joint part 38 pushed in between the two end portions 39 and 40 can be tensioned between the inside of the end portion 40 of the spar 42 and the thrust piece 49. Such an eccentric tensioning mechanism is known per se.

A toothed ring 56 which has a sawtooth profile is formed on the inner face of the thrust piece 49. The fork-shaped joint part 38 carries, on its face confronting the thrust piece 49, a toothed ring 58 with a complementary sawtooth profile. The steep short tooth flanks 60, 62 of the sawtooth profiles 56 and 58 lie in each case at least approximately in a plane containing the axis 64 of the joint arrangement 32, that is to say in diametral planes of the joint arrangement 32. When the two joint parts 36 and 38 are tensioned relative to one another via the tensioning mechanism 46, 50, 54, the sawtooth profiles 56 and 58 coming into engagement with one another, the tooth flanks 60 and 62 bear against one another. If, then, for example, the bed segment 24 is loaded in the way illustrated in FIG. 1, this force acts in the circumferential direction perpendicularly to the tooth flanks 60, 62 acting as blocking faces against a rotational movement. As a result, even under high load, no spreading forces arise, with axial components which could press the toothed rings 56, 58 and consequently the joint parts 36, 38 apart from one another. Even if the eccentric lever were pivoted into its release position under the load on the bed segment 24, as a rule, the two joint parts 38 and 36 would not be displaced spontaneously in the axial direction relative to one another, so that, even in the event of such maloperation, the bed segment 24 maintains its position in relation to the bed segment 22.

Figure 8:
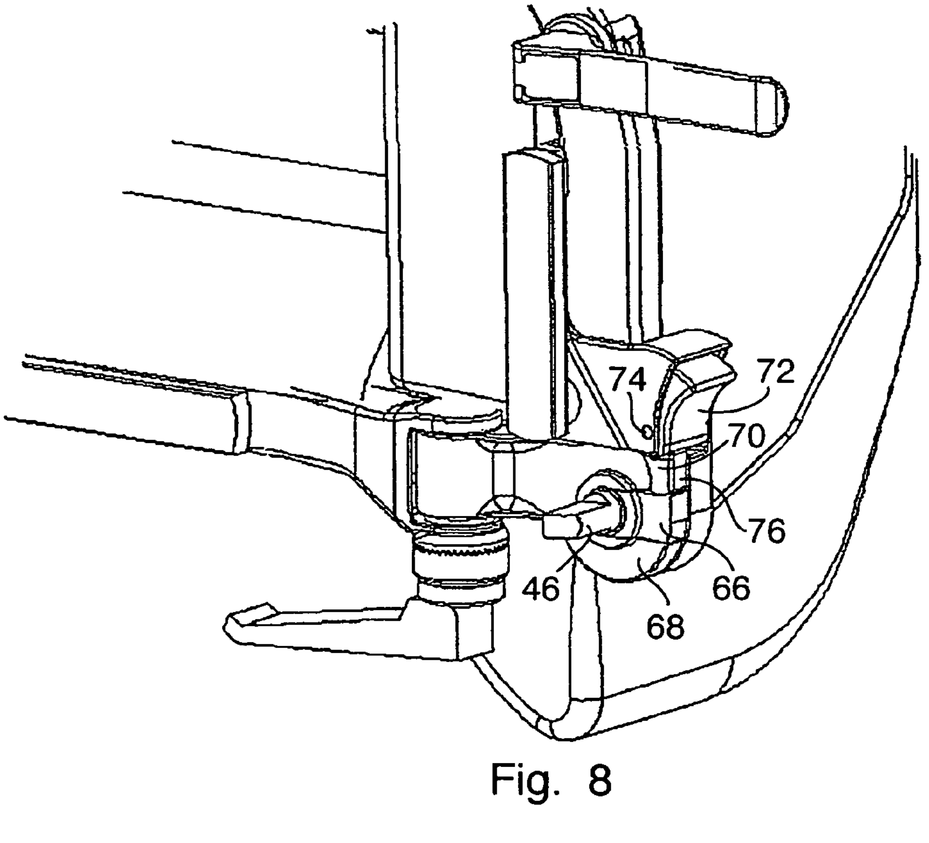
FIG. 8 shows a likewise partially cut away illustration of the joint arrangement in the position of the joint parts in relation to one another, as reproduced in FIGS. 5 and 6.

To increase functional and operating reliability, a radial extension 66 is mounted freely rotatably on the shaft journal (FIG. 8). This extension 66 is dimensioned such that it ends with a longer leg 68 of the two fork legs 68 and 70 of unequal length of the fork-shaped joint part 38, as shown in FIG. 8. At the same time, the extension 66 completely fills the fork aperture remaining after the fork-shaped joint part 38 has been pushed onto the shaft journal 46. When the fork-shaped joint part 38 is pushed onto the shaft journal 46, the extension 66 is automatically set such that it assumes the position illustrated in FIG. 8 in relation to the fork leg 68. The extension 66 prevents the situation where any parts may engage into the fork aperture and obstruct the adjustment of the bed segments 22, 24 in relation to one another. The situation is also prevented where the operating personnel may pinch their fingers in the fork aperture.

Furthermore, on the spar 42, carrying the joint part 36, of the bed segment 22, a locking button 72 also referred to as a disengageable locking element, is mounted pivotably about an axis 74, the said locking button bearing with a locking nose 76 against the shorter fork leg 70 and being supported on the extension 66 when the bed portion 24 forms at least approximately a right angle with the bed portion 22. The locking button 72 with the locking nose 76 prevents the situation where the bed segments 22 and 24 may be pivoted out of the angled position illustrated in FIG. 8 into a stretched-out position, even if the eccentric lever 50 is pivoted into its opening position and the toothed profiles 56, 58 come out of engagement. Only when the locking button 72 is pivoted such that the locking nose 76 releases the extension 66 can the bed segment 24 be pivoted anti-clockwise in FIG. 8, the extension 66 and the fork leg 68 sliding under the locking nose 76. This ensures further safety against an unintentional pivoting of the bed portions 22 and 24 in relation to one another. In order to facilitate the adjustment of the bed segments relative to one another and simplify operation, spring means may be provided between the joint parts, the said spring means pressing the joint parts apart as soon as the tensioning mechanism is opened and the bed segments are relieved of load.

While the present invention has been illustrated and described with respect to a particular embodiment thereof, it should be appreciated by those of ordinary skill in the art that various modifications to this invention may be made without departing from the spirit and scope of the present invention.

Figure 9:
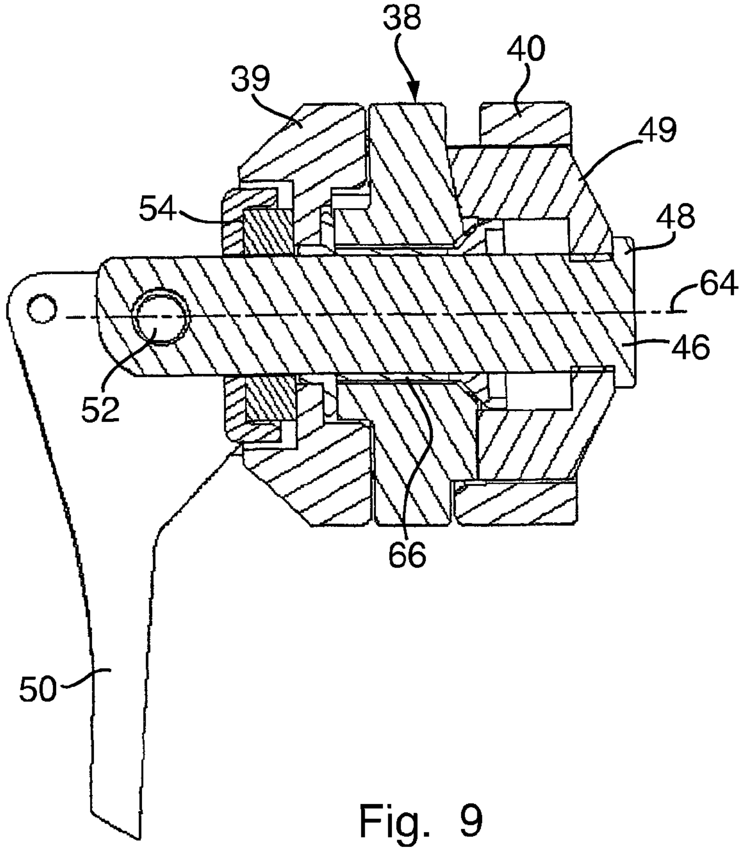
FIG. 9 shows a section, containing the axis, through the joint arrangement.
Figure 10:
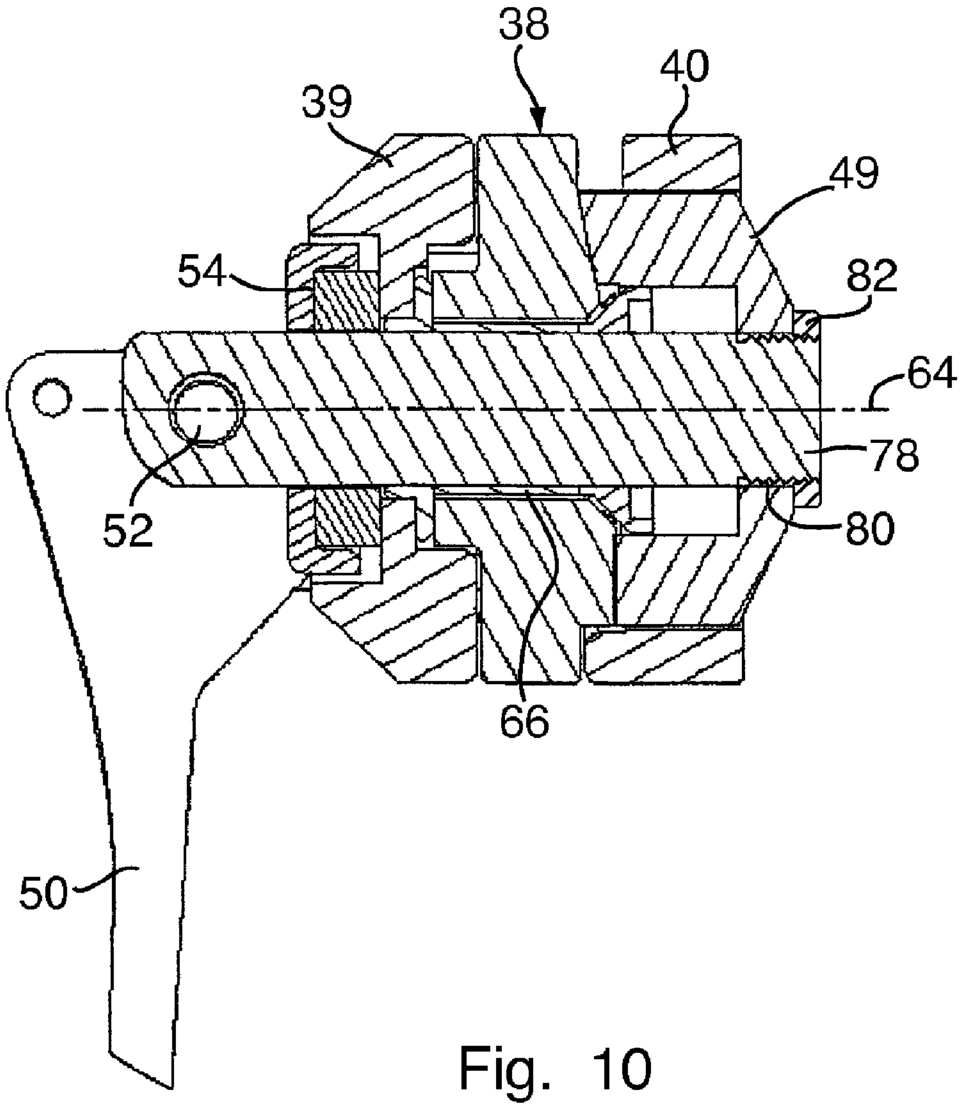
FIG. 10 shows a section, containing the axis, through the joint arrangement of an embodiment of the invention having a screw grip.

For example, FIG. 10, wherein like components have like numbers to those described with reference to FIG. 9, shows another embodiment of the present invention, in which the joint includes a modified shaft journal 78 having a threaded portion 80. In the embodiment shown in FIG. 10, the joint parts are tensioned together by threading a screw grip 82 onto the threaded portion 80 of the modified shaft journal 78.

What is claimed is:

1. A joint arrangement comprising:

a first joint part having two mutually parallel portions with substantially flat opposed faces defining between them a gap, one of the opposed faces including a first sawtooth profile extending around a joint axis substantially perpendicular to the opposed faces;

a shaft journal extending across the gap between the two parallel portions along the joint axis of said first joint part;

a tensioning mechanism operatively connecting the two parallel portions of said first joint part, and actuable via said shaft journal to tension together the two parallel portions; and a second joint part formed as a flat ring with a radial slot and having a side face perpendicular to an axis of the flat ring and formed with a second sawtooth profile extending around the axis of the flat ring;

wherein said second joint part can be assembled into the gap of said first joint part by slipping the radial slot of said second joint part over said shaft journal with the second sawtooth profile facing the first sawtooth profile such that said second joint part is rotatable within the gap about said shaft journal, and such that actuating said tensioning mechanism engages the first sawtooth profile formed on said first joint part with the second sawtooth profile formed on said second joint part for restraining said second joint part relative to said first joint part.

2. The joint arrangement according to claim 1, wherein at least one of the parallel portions of said first joint part has a hole formed therethrough along the joint axis, and said shaft journal is fitted through the hole formed in said first joint part.

3. The joint arrangement according to claim 1, further comprising:

a securing element which projects radially from said shaft journal and which is dimensioned such that said securing element closes the radial slot of said second joint part when said second joint part has been pushed onto said shaft journal.

4. The joint arrangement according to claim 3, wherein the securing element is mounted freely rotatably on the shaft journal.

5. The joint arrangement according to claim 1, wherein said shaft journal is a tie rod of said tensioning mechanism, which is connected at one axial end to a stop supported on one of said first joint part or said second joint part.

6. The joint arrangement according to claim 1, wherein said tensioning mechanism comprises an eccentric lever articulated on said shaft journal.

7. The joint arrangement according to claim 1, wherein said tensioning mechanism comprises a screw grip which is in threaded engagement with said shaft journal.

8. The joint arrangement according to claim 1, wherein the first sawtooth profile and the second sawtooth profile each include angled faces alternating with blocking faces, the blocking faces of the first sawtooth profile extending substantially parallel to the joint axis of said first joint part and the blocking faces of the second sawtooth profile extending substantially parallel to the ring axis of said second joint part, such that, when said tensioning mechanism is engaged, mutual rotation of said first and second joint parts is permitted in one direction about the joint axis of said first joint part and is prevented in the other direction about the joint axis.

9. A joint arrangement comprising:

a first joint part having two mutually parallel portions with substantially flat opposed faces defining between them a gap, one of the opposed faces including a first sawtooth profile extending around a joint axis substantially perpendicular to the opposed faces;

a shaft journal extending across the gap between the two parallel portions along the joint axis of said first joint part;

a tensioning mechanism operatively connecting the two parallel portions of said first joint part via said shaft journal, and actuable to tension together the two parallel portions of said first joint part;

a second joint part formed as a flat ring with a radial slot and having a side face formed with a second sawtooth profile extending around the axis of the flat ring and assembled into the gap of said first joint part by slipping the radial slot of said second joint part over said shaft journal in an unlocked position such that said second joint part is rotatable within the gap about said shaft journal, and such that actuating said tensioning mechanism can engage the first sawtooth profile formed on said first joint part with the second sawtooth profile formed on said second joint part for restraining said second joint part relative to said first joint part in a locked position; and a disengageable locking element arranged on one of said first joint part or said second joint part, which in an engaged position extends into the gap of said first joint part to engage the other of said first joint part or said second joint part to prevent a relative movement of the joint parts in at least one direction of rotation about the joint axis.

10. The joint arrangement according to claim 9, wherein said shaft journal is a tie rod of said tensioning mechanism, which is connected at one axial end to a stop supported on one of said first joint part or said second joint part.

11. The joint arrangement according to claim 10, wherein said tensioning mechanism comprises an eccentric lever articulated on said shaft journal.

12. The joint arrangement according to claim 10, wherein said tensioning mechanism comprises a screw grip which is in threaded engagement with said shaft journal.

13. The joint arrangement according to claim 9, wherein the first sawtooth profile and the second sawtooth profile each include angled faces alternating with blocking faces, the blocking faces of the first sawtooth profile extending substantially parallel to the joint axis of said first joint part and the blocking faces of the second sawtooth profile extending substantially parallel to the ring axis of said second joint part, such that, when said tensioning mechanism is engaged, mutual rotation of said first and second joint parts is permitted in one direction about the joint axis of said first joint part and is prevented in the other direction about the joint axis.

* * * * *